United States Patent
Cox et al.

(10) Patent No.: US 8,495,506 B2
(45) Date of Patent: Jul. 23, 2013

(54) IDENTIFYING MUTUAL FRIENDS IN ONLINE ENVIRONMENTS

(75) Inventors: Susan M. Cox, Rochester, MN (US); Janani Janakiraman, Austin, TX (US); Fang Lu, Billerica, MA (US); Loulwa Salem, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 12/111,670

(22) Filed: Apr. 29, 2008

(65) Prior Publication Data

US 2009/0271714 A1    Oct. 29, 2009

(51) Int. Cl.
  G06F 3/00   (2006.01)
  G06F 9/00   (2006.01)
  G06F 17/00  (2006.01)

(52) U.S. Cl.
  USPC ........... 715/757; 715/753; 715/751; 715/706; 715/789

(58) Field of Classification Search
  USPC .......................... 715/757, 753, 751, 706, 789
  See application file for complete search history.

(56) References Cited

U.S. PATENT DOCUMENTS

| | | | | |
|---|---|---|---|---|
| 5,828,839 | A * | 10/1998 | Moncreiff | 709/204 |
| 5,880,731 | A * | 3/1999 | Liles et al. | 715/758 |
| 6,370,563 | B2 * | 4/2002 | Murakami et al. | 709/205 |
| 6,681,108 | B1 | 1/2004 | Terry et al. | 455/412.2 |
| 2001/0048449 | A1 * | 12/2001 | Baker | 345/758 |
| 2003/0236835 | A1 * | 12/2003 | Levi et al. | 709/204 |
| 2006/0212451 | A1 | 9/2006 | Serdy, Jr. et al. | 707/10 |
| 2007/0198510 | A1 | 8/2007 | Ebanks | 707/5 |
| 2007/0255831 | A1 | 11/2007 | Hayashi et al. | 709/226 |
| 2009/0002178 | A1 * | 1/2009 | Guday et al. | 340/573.1 |
| 2009/0193341 | A1 * | 7/2009 | Murray et al. | 715/751 |

OTHER PUBLICATIONS

Davies et al., Ontoshare—A Knowledge Management Environment for Virtual, Proceedings of the 2nd Intl Conf. on Knowledge Capture, pp. 20-27, Date: 2003.
Merali et al., Knowledge Capture and Utilization in Virtual Communities, Proceedings of the 1st International Conference on Knowledge Capture, pp. 92-99, Date: 2001.
Steed et al., Strangers and Friends in Caves: An Exploratory Study of Collaboration in Networked IPT Systems for Extended Period of Time, Proceedings of the 2003 Symposium on Interactive 3D Graphics, pp. 51-54, Date: 2003.

\* cited by examiner

*Primary Examiner* — Boris Pesin
*Assistant Examiner* — Sabrina Greene
(74) *Attorney, Agent, or Firm* — VanLeeuwen & VanLeeuwen

(57) ABSTRACT

The invention described herein detects an external user entering into a virtual world that includes a virtual area. In turn, the invention described herein identifies a plurality of joined users that joined each virtual area and computes a joined user weighting for each of the plurality of joined users. The joined user weightings include friend of a friend level weightings and commonality weightings. Next, the invention described herein computes a virtual area friendliness level for each of the virtual areas by aggregating each of the joined user weightings for each of the virtual areas, and provides the virtual area friendliness levels to the external user in order for the external user to select the appropriate virtual area.

17 Claims, 7 Drawing Sheets

IDENTIFYING MUTUAL FRIENDS IN ONLINE ENVIRONMENTS

BACKGROUND OF THE INVENTION

1. Technical Field

The present invention relates to identifying mutual friends in an online environment. More particularly, the present invention relates to providing virtual area friendliness levels by aggregating joined user weightings included in each virtual area.

2. Description of the Related Art

Computer applications allow users to join virtual areas within a virtual world and communicate with other users within the virtual area. Typically, the computer application provides multiple virtual area choices for which the user to select and, in many cases, the user selects uninteresting virtual areas before selecting a virtual area of interest.

SUMMARY

The invention described herein detects an external user entering into a virtual world that includes a virtual area. In turn, the invention described herein identifies a plurality of joined users that joined the virtual area and computes a joined user weighting for each of the plurality of joined users. Next, the invention described herein computes a virtual area friendliness level for the virtual area by aggregating each of the joined user weightings and provides the virtual area friendliness level to the external user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
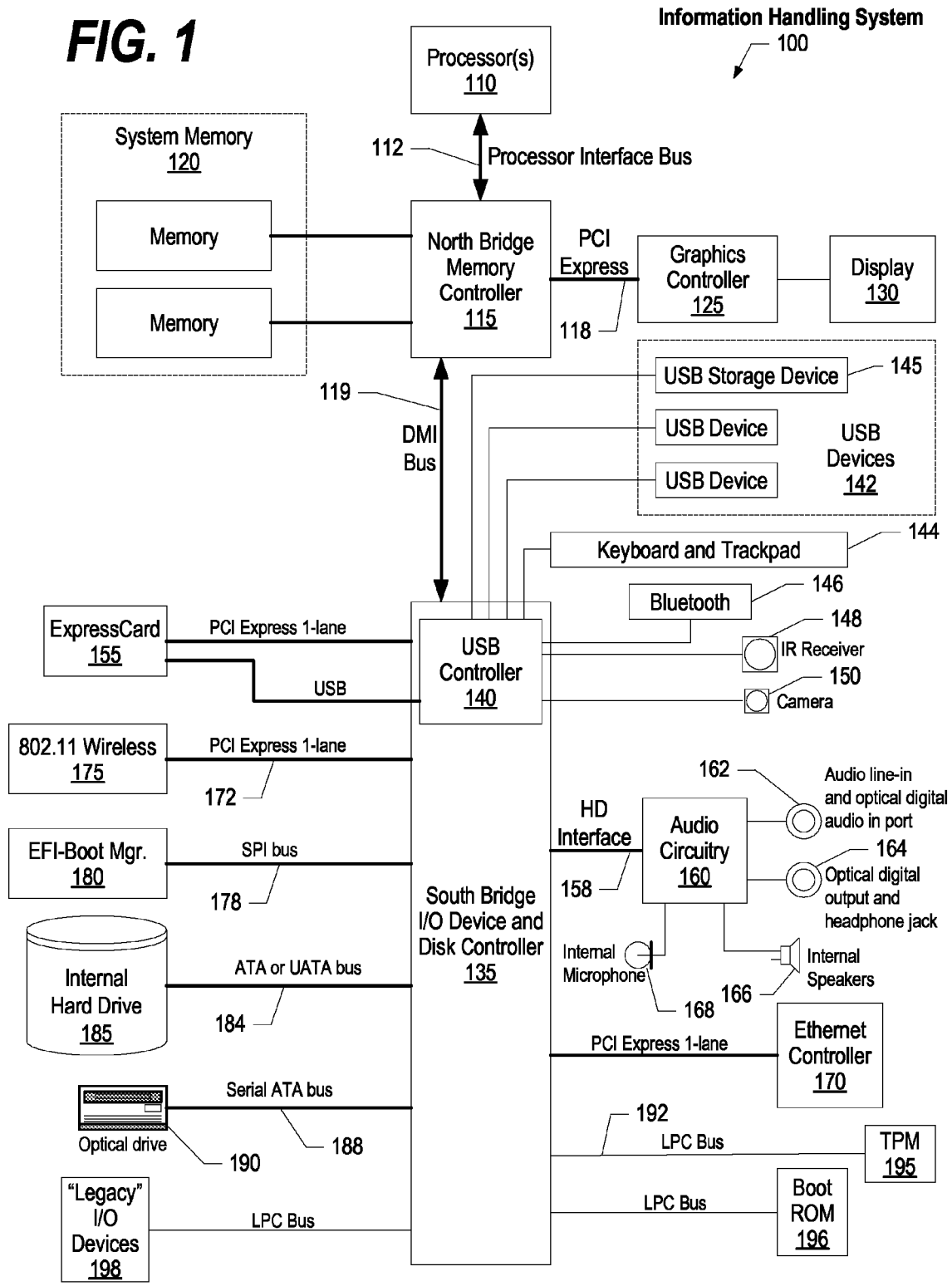
FIG. 1 is a block diagram of a data processing system in which the methods described herein can be implemented.
Figure 2:
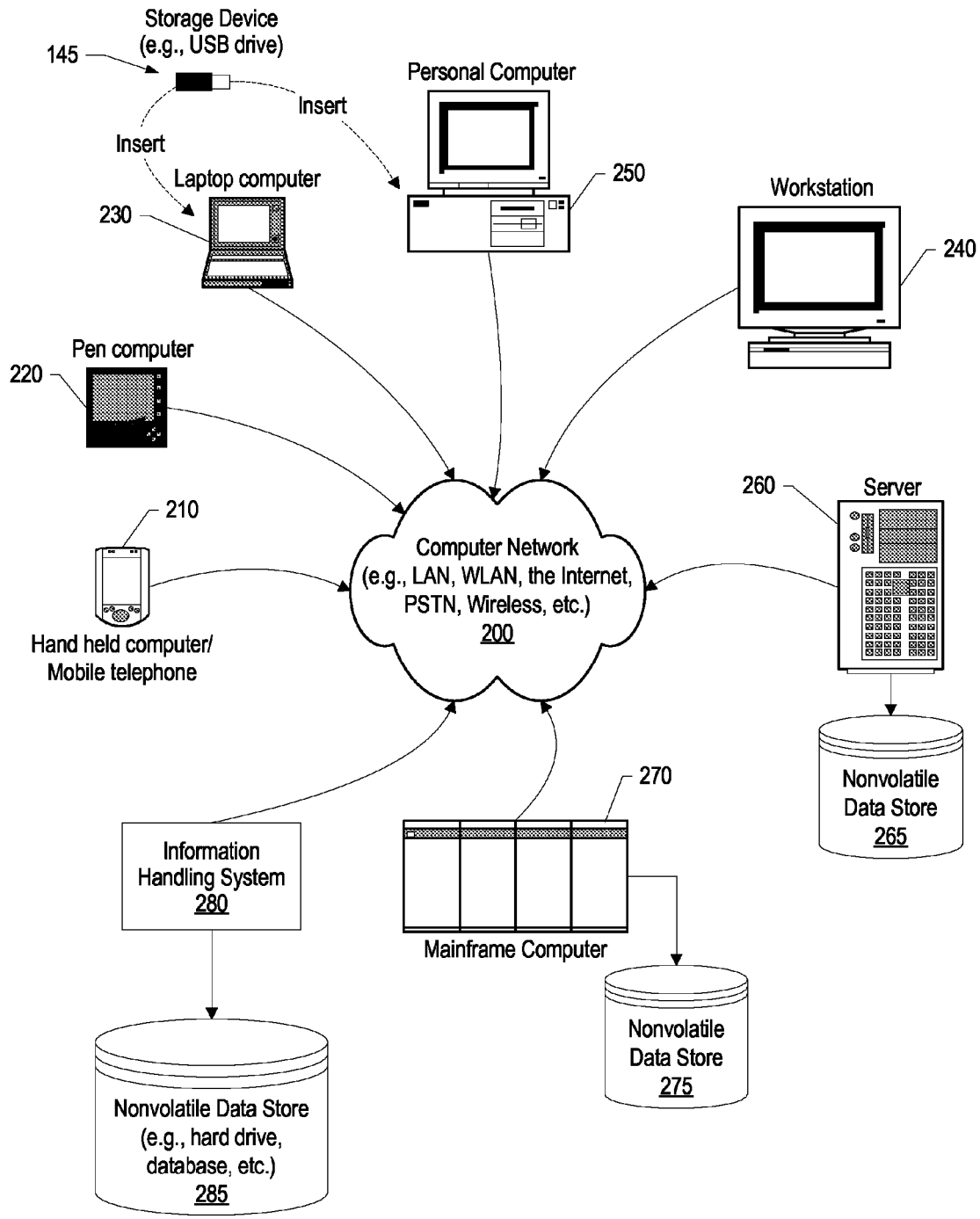
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) and the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
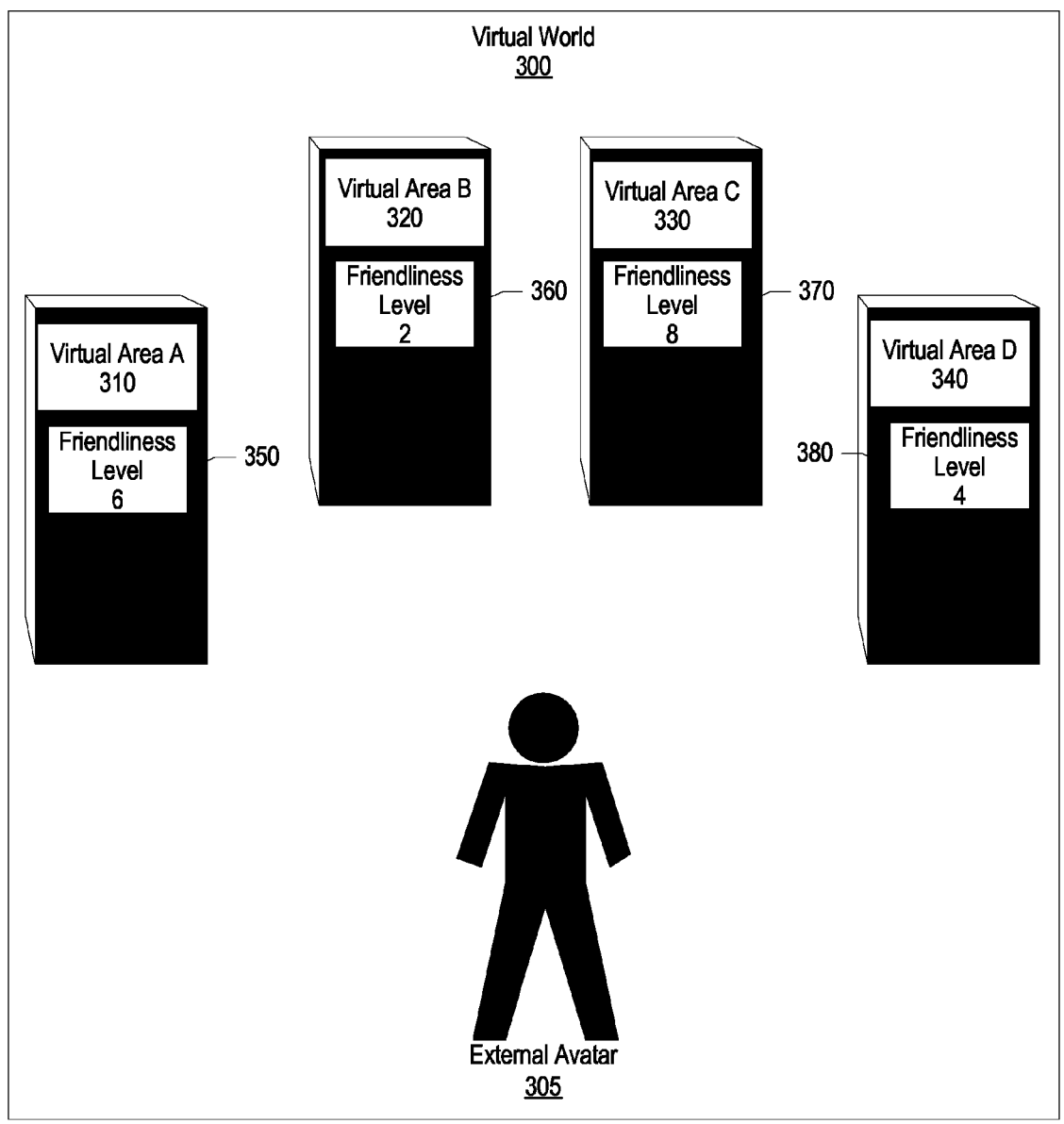
FIG. 3 is a diagram showing an external user viewing virtual areas and their corresponding virtual area friendliness levels.

FIG. 3 is a diagram showing an external user viewing virtual areas and their corresponding virtual area friendliness levels. The external user, which external avatar 305 represents, enters virtual world 300. Upon entering, processing computes a virtual area friendliness level for each of virtual areas 310 through 340 (see FIG. 7 and corresponding text for further details). The virtual area friendliness level is an aggregation of weightings, such as "friend of a friend weightings" and "commonality weightings," for users that have joined the particular virtual areas. Friend of a friend level weightings are based upon a degree of friendship separation between a joined user and the external user. For example, Bill may be the external user and Sally may be the joined user. Bill may not know Sally, but both Bill and Sally know Tom. In this example, Sally is considered a "Level 2" friend of a friend to Bill (see FIG. 4 and corresponding text for further details). Commonality weightings are based upon common interests between a joined user and the external user, such as job title, hobbies, etc.

Figure 4:
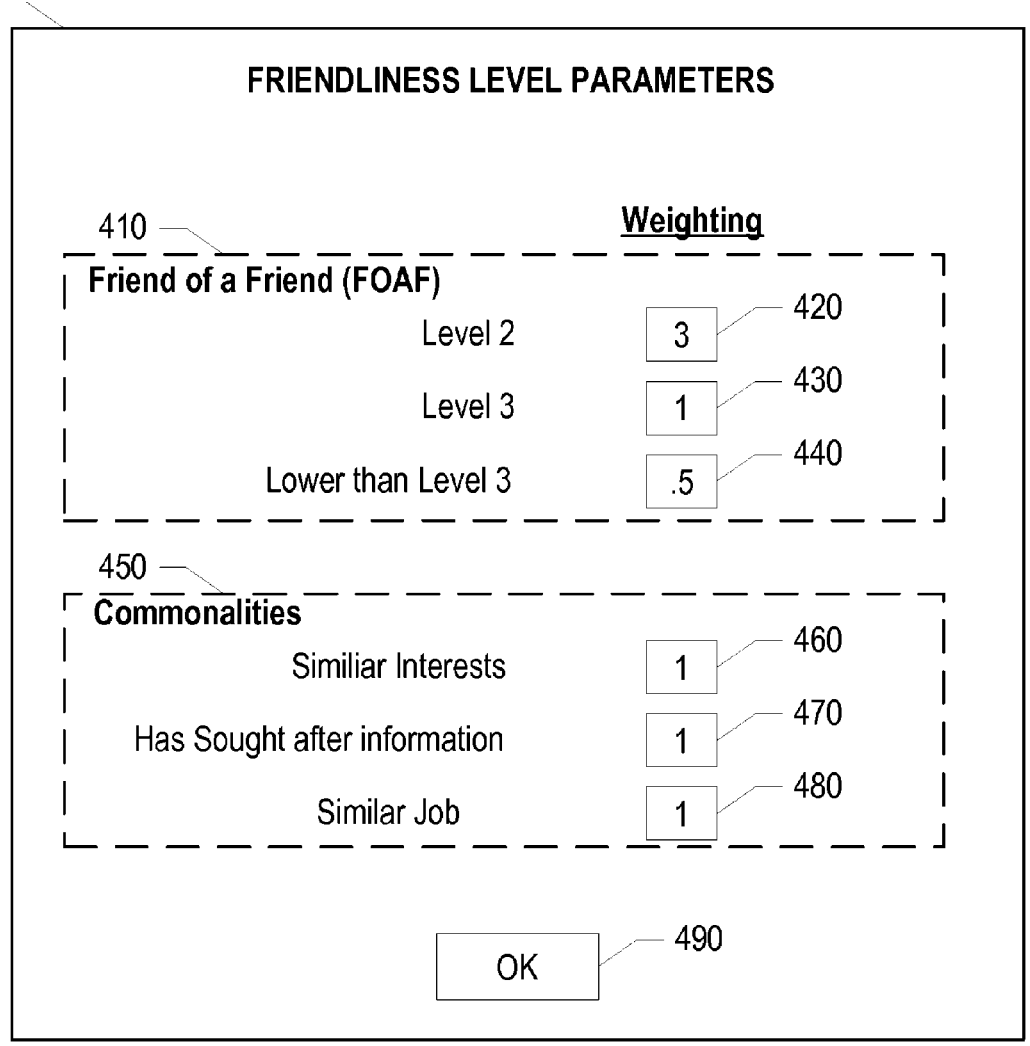
FIG. 4 is a diagram of a window displaying friendliness level parameters for which an external user may modify.

Processing assigns the weightings based upon friendliness level parameters in which the external user assigns (see FIG. 4 and corresponding text for further details). As such, the external user may tailor the amount of weighting placed on particular parameters based upon the external user's motive at the time. For example, the external user may place a high weighting on a job title when the external user is seeking a new job, or place a high weighting on a friend of a friend for social reasons.

FIG. 3 shows computed virtual area friendliness levels for each of virtual areas 310 through 340. Virtual area A 310 has a virtual area friendliness level of "6" (banner 350). Virtual area B 320 has a virtual area friendliness level of "2" (banner 360). Virtual area C 330 has a virtual area friendliness level of "8" (banner 370). Virtual area D 340 has a virtual area friendliness level of "4" (banner 380). When the external user selects one of the virtual areas, processing displays the virtual area's corresponding joined avatars, which represent the joined users, along with their corresponding joined user weightings (see FIG. 5 and corresponding text for further details).

FIG. 4 is a diagram of a window displaying friendliness level parameters for which an external user may modify. An external user modifies friendliness level parameters included in window 400 in order to place appropriate weightings upon friend of a friend levels (area 410) and commonalties (area 450). FIG. 4 shows that the external user included a weighting of "3" in box 420 for a level 2 friend of a friend. Therefore, when processing identifies a joined user as a level 2 friend of a friend, processing adds "3" to the joined user's weighting (see FIG. 7 and corresponding text for further details). Likewise, the external user included a weighting of "1" and "0.5" in boxes 430 and 440, respectively, for a level 3 and lower than a level 3 friend of a friend.

Area 450 includes commonality weightings for similar interests, sought after information, and similar jobs. FIG. 4 shows that the external user included a weighting of "1" in box 460 for a joined user that has a similar interest as the external user. For example, the external user may play tennis and, when processing identifies a joined user that has a tennis interest, processing adds a "1" to the joined user's weighting. In one embodiment, the external user may add/remove particular parameters. For example, the external user may add sub-items under similar interests to place more weight on one interest over another interest.

FIG. 4 also shows that the external user included a weighting of "1" in box 470 for a joined user that has sought after information. For example, the external user may include a request for information pertaining to a foreign country in the external user's profile. In this example, processing assigns a "1" to a joined user that possesses information about the foreign country (e.g., lives in the country, traveled to the country, etc.). Finally, FIG. 4 shows that the external user included a weighting of "1" in box 480 for a joined user that has a job similar to the external user, such as "accountant." When the external user is finished adding weightings to boxes 420-440 and 460-480, the external user selects command button 490 to save the weightings.

Figure 5:
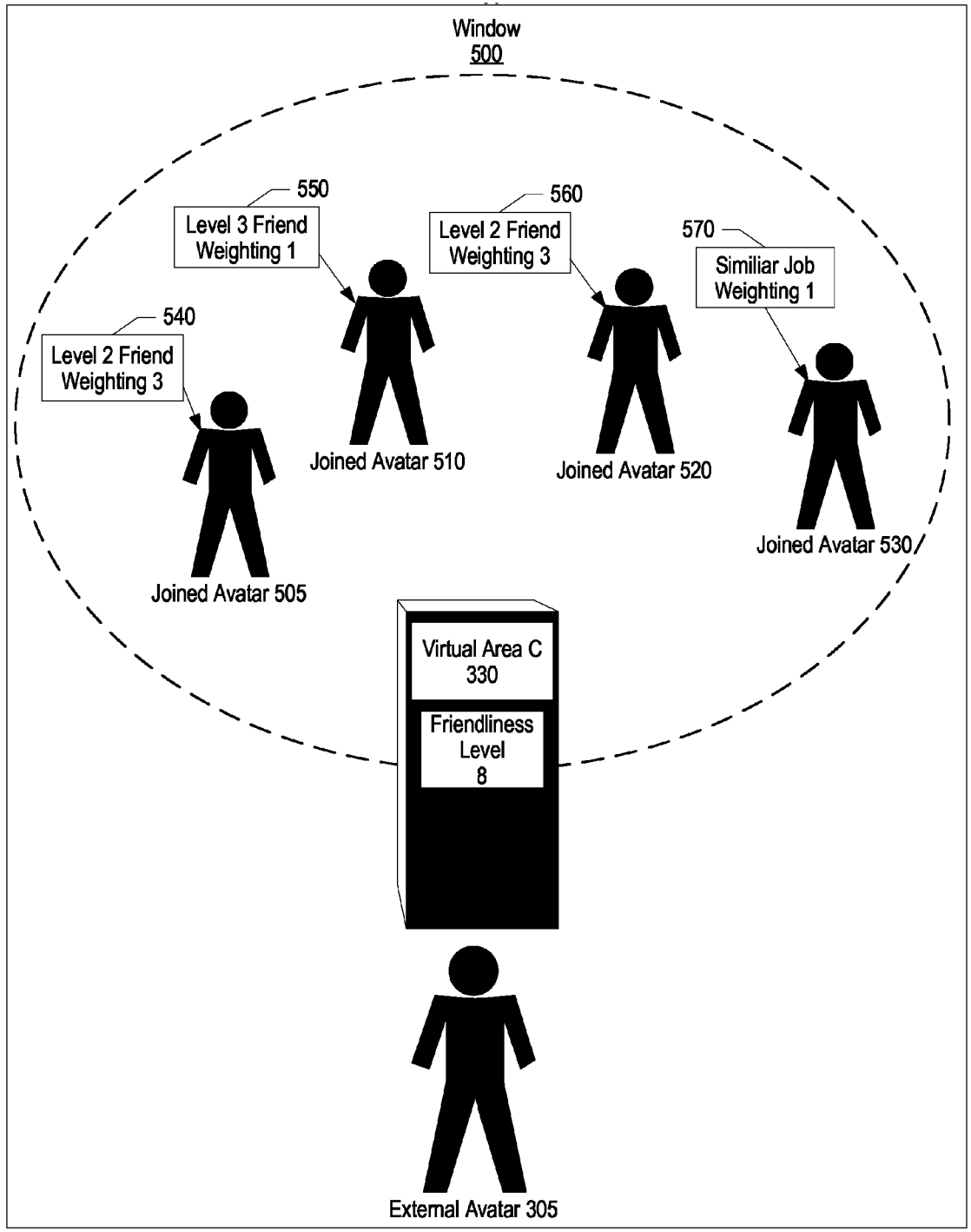
FIG. 5 is a diagram of an external user selecting a virtual area and displaying joined avatars along with their corresponding joined user weightings.

FIG. 5 is a diagram of an external user selecting a virtual area and displaying joined avatars along with their corresponding joined user weightings. Processing displays information shown in window 500 when an external user selects a virtual area, such as virtual area 330. Window 500 shows external avatar 305, which represents the external user, along with joined avatars 505 through 530. Each of joined avatars 505 through 530 represents a particular joined user to virtual area 330. External avatar 305 and virtual area 330 are the same as that shown in FIG. 3.

Processing displays banners 540 through 570, which included computed weighted information, in proximity to their corresponding joined avatar. Banner 540 shows that the joined user corresponding to joined avatar 505 is a level "2" friend of a friend, which computes to a joined user weighting of "3." Banner 550 shows that the joined user corresponding to joined avatar 510 is a level "3" friend of a friend, which computes to a joined user weighting of "1." Banner 560 shows that the joined user corresponding to joined avatar 520 is a level "2" friend of a friend, which computes to a joined user weighting of "3." And, banner 570 shows that the joined user corresponding to joined avatar 530 has a similar job title, which computes to a joined user weighting of "1." As can be seen, adding the joined user ratings together results in a virtual area friendliness level of "8." As those skilled in the art can appreciate, a particular joined user may have multiple weightings that are aggregated into a joined user weighting, such as a friend of a friend along with multiple common interests.

Figure 6:
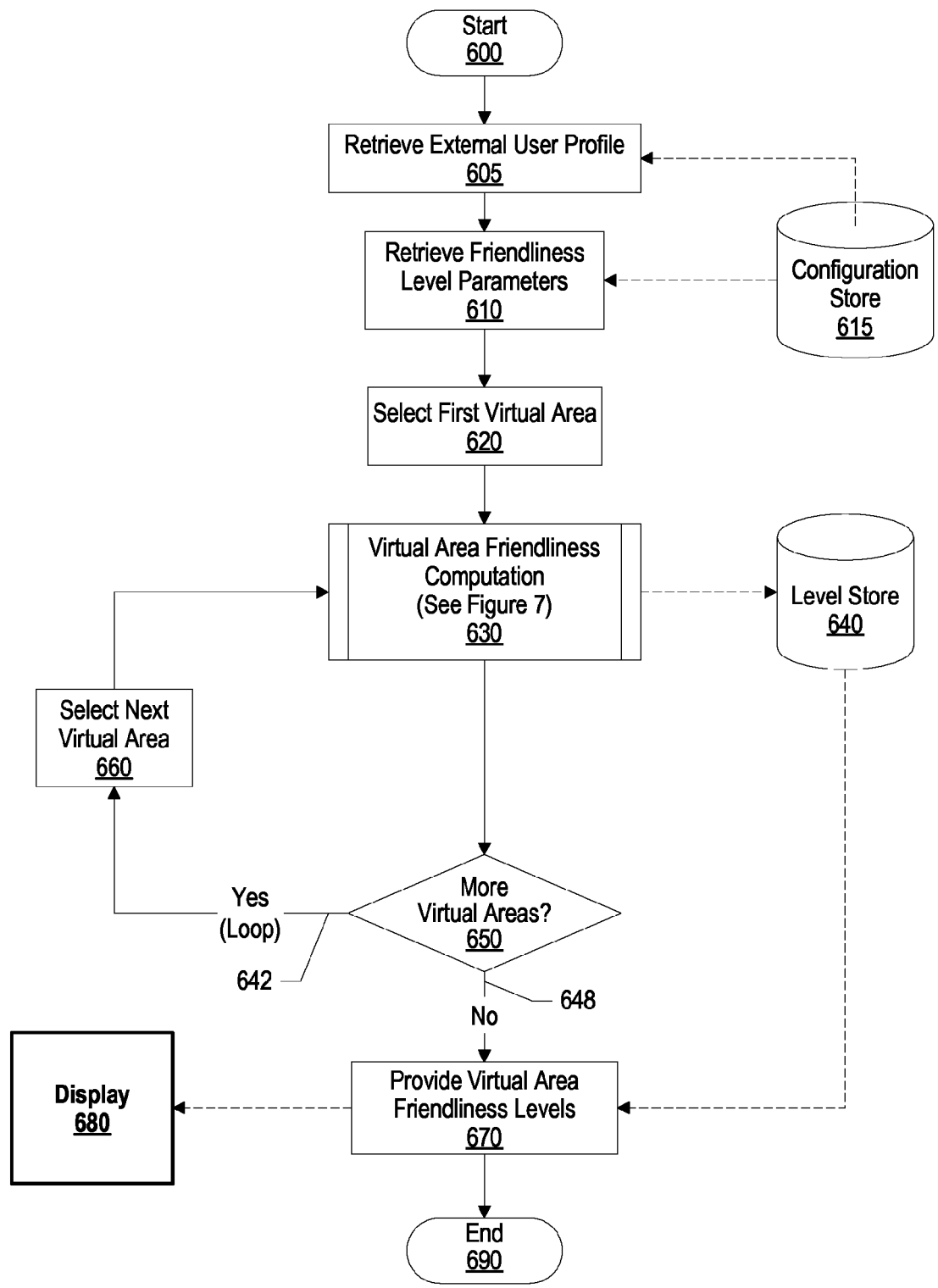
FIG. 6 is a high level flowchart showing steps taken in computing virtual area friendliness levels within a virtual world.

FIG. 6 is a high level flowchart showing steps taken in computing virtual area friendliness levels within a virtual world. When an external user enters a virtual world, processing presents the external user entrances to various virtual areas along with corresponding virtual area friendliness levels, such as that shown in FIG. 3. As such, the external user is able to select a virtual area with the highest virtual area friendliness level.

Processing commences at 600, whereupon processing retrieves an external user profile that corresponds to the external user from configuration store 615 (step 605). The external user profile includes the external user's friends that processing utilizes when determining friend of a friend (FOAF) weightings. The external user profile also includes the external user's interests, such as hobbies, employment information, etc. that processing uses to identify commonalties between the external user and joined users. Configuration store 615 may be stored on a nonvolatile storage area, such as a computer hard drive.

At step 610, processing retrieves friendliness level parameters from configuration store 615. The external user sets the friendliness level parameters, which signify how much weighting processing should place on friend of a friend levels and commonality levels (see FIG. 4 and corresponding text for further details).

Once processing has retrieved the external user profile and the friendliness level parameters, processing selects a first virtual area at step 620. Next, processing proceeds through a series of steps to compute a virtual area friendliness level for the selected virtual area, which is stored in level store 640 (pre-defined process block 630, see FIG. 7 and corresponding text for further details).

A determination is made as to whether there are more virtual areas to analyze (decision 650). If there are more virtual areas to analyze, decision 650 branches to "Yes" branch 642, which loops back to select (step 660) and process the next virtual area. This looping continues until there are no more virtual areas to process, at which point decision 650 branches to "No" branch 648.

At step 670, processing provides the virtual area friendliness levels for each of the virtual areas, which are displayed on display 680. As such, the external user views a single window that includes virtual area friendliness levels for each virtual area (see FIG. 3 and corresponding text for further details). Processing ends at 690.

Figure 7:
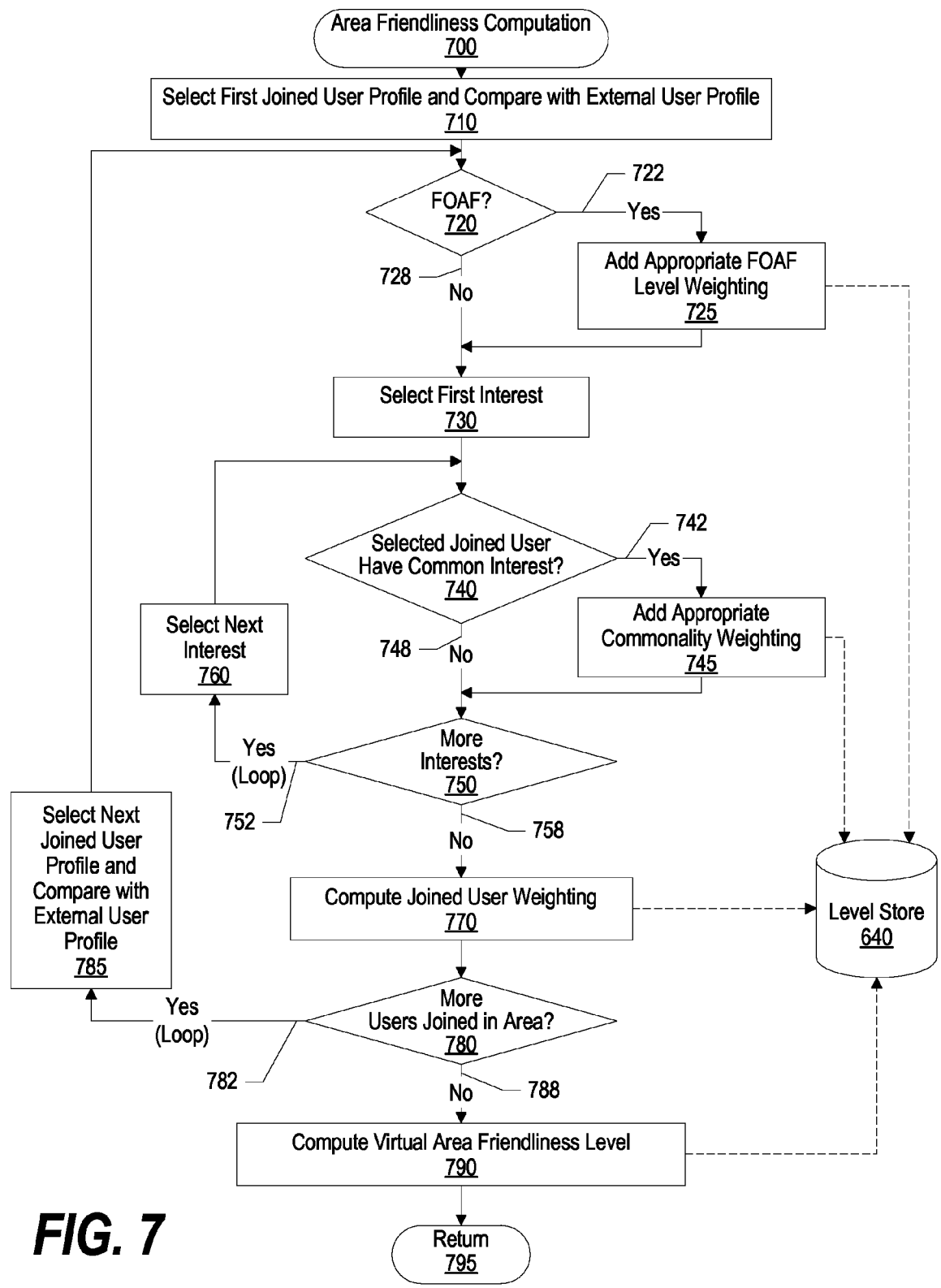
FIG. 7 is a diagram showing steps taken in computing joined user weightings and aggregating the joined user weightings into a virtual area friendliness level.

FIG. 7 is a diagram showing steps taken in computing joined user weightings and aggregating the joined user weightings into a virtual area friendliness level. Processing detects an external user entering a virtual world, and proceeds through a series of steps that aggregate weightings based upon comparing joined user's interests and mutual friends with an external user's interests and mutual friends. Processing then computes a virtual area friendliness level for each virtual area included in the virtual world.

Processing commences at 700, whereupon processing selects a first joined user's profile within a virtual area and compares the joined user profile with the external user profile (step 710). Based upon the comparison, a determination is made as to whether the external user and the joined user have a friend of a friend (decision 720). For example, Bill may be the external user and Sally may be the joined user. Bill may not know Sally, but both Bill and Sally know Tom. In this example, Sally is considered a "Level 2" friend of a friend to Bill (see FIG. 4 and corresponding text for further details).

If the joined user is a friend of a friend to the external user, decision 720 branches to "Yes" branch 722 whereupon processing adds an appropriated friend of a friend level weighting to the virtual area friendliness level stored in level store 640 (step 725). The friend of a friend level weighting is based upon friendliness level parameters that are set by the external user (see FIG. 4 and corresponding text for further details). On the other hand, if the joined user is not a friend of a friend to the external user, decision 720 branches to "No" branch 728 bypassing the friend of a friend level weighting addition step.

At step 730, processing selects the external user's first interest included in the external user's profile (hobby, job title, etc.). A determination is made as to whether the joined user has the same interest (decision 740). For example, the external user and the joined user may both be software engineers. If the joined user has the same interest as the external user, decision 740 branches to "Yes" branch 742 whereupon processing adds an appropriate commonality weighting to the virtual area friendliness level based upon the amount of weight that the external user placed upon the particular interest (included in the friendliness level parameters). For example, when the external user is looking for a golf partner, the external user may place a high weighting on a "golf" interest. In another example, when a user is seeking a job, the external user may place a high weighting on the external user's job title. On the other hand, if the joined user does not have the same interest as the external user's first selected interest, decision 740 branches to "No" branch 748.

A determination is made as to whether there are more external user interests to process (decision 750). If there are more external user interests, decision 750 branches to "Yes" branch 752, whereupon processing loops back to select (step 760) and processes the next interest. This looping continues until processing process each external user interest, at which point decision 750 branches to "No" branch 758.

At step 770, processing computes a joined user weighting for the selected joined user by aggregating the friend of a friend level weightings and each of the commonality weightings. For example, processing may have stored a friend of a friend level weighting of 2 and commonality weightings of 3, 1, and 0.5. In this example, the joined user weighting is 2+3+1+0.5=6.5, which is stored in level store 640.

A determination is made as to whether there are more joined users in the virtual area (decision 780). If there are more joined users, decision 780 loops back to "Yes" branch 782, which loops back to compare the next joined user's profile with the external user's profile (step 785), and compute a joined user weighting for the next joined user. This looping continues until there are no more joined users to process, at which point decision 780 branches to "No" branch 788.

At step 790, processing computes a virtual area friendliness level for the virtual area by aggregating each of the computed joined user weightings. For example, the virtual area may include four users with computed joined user weightings of 6, 4, 8, and 3. In this example, the virtual area friendliness level is 6+4+8+3=21. The virtual area friendliness level is stored in level store 640, and processing returns at 795.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A machine-implemented method comprising:
   detecting entrance from an external user into a virtual world that includes a plurality of virtual areas, the plurality of virtual areas including a first virtual area and a second virtual area;
   identifying, for each one of the plurality of virtual areas, a plurality of users joined to one of the plurality of virtual areas, wherein the plurality of users includes a plurality of first users joined to the first virtual area and a plurality of second users joined to the second virtual area;
   computing a first user weighting for each of the plurality of first users and computing a second user weighting for each of the plurality of second users, the computing resulting in a plurality of first user weightings and a plurality of second user weightings;
   computing a first virtual area friendliness level by aggregating the plurality of first user weightings and computing a second virtual area friendliness level by aggregating the plurality of second user weightings;
   simultaneously displaying the first virtual area friendliness level and the second virtual area friendliness level to the external user;

receiving, in response to displaying the first virtual area friendliness level and the second virtual area friendliness level, a virtual area selection from the external user that selects the second virtual area friendliness level; and displaying the plurality of second user weightings to the external user in response to receiving the virtual area selection.

2. The method of claim 1 further comprising:

retrieving an external user profile corresponding to the external user;

comparing the external user profile to one or more joined user profiles in order to determine whether one of the plurality of second users is a friend of a friend;

in response to determining that one of the plurality of second users is a friend of a friend, including a friend of a friend level weighting in one of the second user weightings;

comparing the external user profile to one or more of the second user profiles in order to determine whether one of the plurality of second users has a commonality with the external user; and in response to determining that one of the plurality of second users has a commonality with the external user, including a commonality weighting in one of the second user weightings.

3. The method of claim 2 wherein one of the plurality of second user weightings includes both the friend of a friend level weighting and the commonality weighting.

4. The method of claim 2 further comprising:

wherein the friend of a friend level weighting indicates a degree of friendship separation from one of the second users and the external user; and wherein the commonality weighting indicates an interest intersection between the external user and one of the second users.

5. The method of claim 1 further comprising:

displaying a joined avatar for each of the plurality of second users, resulting in a plurality of joined avatars;

displaying the second user weightings for each of the second users in proximity to their corresponding joined avatars; and displaying an external avatar, which represents the external user.

6. The method of claim 5 wherein the displayed joined avatars represent the second users.

7. A peripheral device comprising:

one or more processors;

a memory accessible by at least one of the processors;

a nonvolatile storage area accessible by at least one of the processors;

a set of instructions stored in the memory and executed by at least one of the processors in order to perform actions of:

detecting entrance from an external user into a virtual world that includes a plurality of virtual areas, the plurality of virtual areas including a first virtual area and a second virtual area;

identifying, for each one of the plurality of virtual areas, a plurality of users joined to one of the plurality of virtual areas, wherein the plurality of users includes a plurality of first users joined to the first virtual area and a plurality of second users joined to the second virtual area;

computing a first user weighting for each of the plurality of first users and computing a second user weighting for each of the plurality of second users, the computing resulting in a plurality of first user weightings and a plurality of second user weightings;

computing a first virtual area friendliness level by aggregating the plurality of first user weightings and computing a second virtual area friendliness level by aggregating the plurality of second user weightings;

simultaneously displaying the first virtual area friendliness level and the second virtual area friendliness level to the external user;

receiving, in response to displaying the first virtual area friendliness level and the second virtual area friendliness level, a virtual area selection from the external user that selects the second virtual area friendliness level; and displaying the plurality of second user weightings to the external user in response to receiving the virtual area selection.

8. The peripheral device of claim 7 wherein the set of instructions performs actions of:

retrieving an external user profile corresponding to the external user;

comparing the external user profile to one or more joined user profiles in order to determine whether one of the plurality of second users is a friend of a friend;

in response to determining that one of the plurality of second users is a friend of a friend, including a friend of a friend level weighting in one of the second user weightings;

comparing the external user profile to one or more of the second user profiles in order to determine whether one of the plurality of second users has a commonality with the external user; and in response to determining that one of the plurality of second users has a commonality with the external user, including a commonality weighting in one of the second user weightings.

9. The peripheral device of claim 8 wherein one of the plurality of second user weightings includes both the friend of a friend level weighting and the commonality weighting.

10. The peripheral device of claim 8 wherein the friend of a friend level weighting indicates a degree of friendship separation from one of the second users and the external user; and wherein the commonality weighting indicates an interest intersection between the external user and one of the second users.

11. The peripheral device of claim 7 wherein the set of instructions performs actions of:

displaying a joined avatar for each of the plurality of second users, resulting in a plurality of joined avatars;

displaying the second user weightings for each of the second users in proximity to their corresponding joined avatars; and displaying an external avatar, which represents the external user.

12. The peripheral device of claim 11 wherein the displayed joined avatars represent the second user.

13. A non-transitory computer readable storage medium storing instructions that when executed by an information handling system, causes the information handling system to perform actions that include:

detecting entrance from an external user into a virtual world that includes a plurality of virtual areas, the plurality of virtual areas including a first virtual area and a second virtual area;

identifying, for each one of the plurality of virtual areas, a plurality of users joined to one of the plurality of virtual areas, wherein the plurality of users includes a plurality of first users joined to the first virtual area and a plurality of second users joined to the second virtual area;

computing a first user weighting for each of the plurality of first users and computing a second user weighting for each of the plurality of second users, the computing resulting in a plurality of first user weightings and a plurality of second user weightings;

computing a first virtual area friendliness level by aggregating the plurality of first user weightings and computing a second virtual area friendliness level by aggregating the plurality of second user weightings;

simultaneously displaying the first virtual area friendliness level and the second virtual area friendliness level to the external user;

receiving, in response to displaying the first virtual area friendliness level and the second virtual area friendliness level, a virtual area selection from the external user that selects the second virtual area friendliness level; and displaying the plurality of second user weightings to the external user in response to receiving the virtual area selection.

14. The non-transitory computer readable storage medium of claim 13 wherein the information handling system further performs actions that include:

retrieving an external user profile corresponding to the external user;

comparing the external user profile to one or more joined user profiles in order to determine whether one of the plurality of second users is a friend of a friend;

in response to determining that one of the plurality of second users is a friend of a friend, including a friend of a friend level weighting in one of the second user weightings;

comparing the external user profile to one or more of the second user profiles in order to determine whether one of the plurality of second users has a commonality with the external user; and in response to determining that one of the plurality of second users has a commonality with the external user, including a commonality weighting in one of the second user weightings.

15. The non-transitory computer readable storage medium of claim 14 wherein one of the plurality of second user weightings includes both the friend of a friend level weighting and the commonality weighting.

16. The non-transitory computer readable storage medium of claim 14 wherein the friend of a friend level weighting indicates a degree of friendship separation from one of the second users and the external user; and wherein the commonality weighting indicates an interest intersection between the external user and one of the joined users.

17. The non-transitory computer readable storage medium of claim 13 wherein the information handling system further performs actions that include:

displaying a joined avatar for each of the plurality of second users, resulting in a plurality of joined avatars;

displaying the second user weightings for each of the second users in proximity to their corresponding joined avatars; and displaying an external avatar, which represents the external user.

* * * * *